US012639567B2

(12) United States Patent
Dhurandhar et al.

(10) Patent No.: US 12,639,567 B2
(45) Date of Patent: May 26, 2026

(54) MULTIPLE STAGE KNOWLEDGE TRANSFER

(71) Applicant: INTERNATIONAL BUSINESS MACHINES CORPORATION, Armonk, NY (US)

(72) Inventors: Amit Dhurandhar, Yorktown Heights, NY (US); Tejaswini Pedapati, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 17/849,969

(22) Filed: Jun. 27, 2022

(65) Prior Publication Data

US 2023/0419103 A1     Dec. 28, 2023

(51) Int. Cl.
G06N 3/08          (2023.01)
G06N 3/045         (2023.01)

(52) U.S. Cl.
CPC ............... G06N 3/08 (2013.01); G06N 3/045 (2023.01)

(58) Field of Classification Search
CPC .................................. G06N 3/045; G06N 3/08
See application file for complete search history.

(56) References Cited

U.S. PATENT DOCUMENTS

2004/0193633 A1     9/2004  Petculescu et al.
2020/0219027 A1     7/2020  Lv et al.

2020/0364542 A1*    11/2020  Sun ........................... G06N 3/08
2021/0201196 A1*    7/2021   Liu ........................... G06F 40/30
2021/0264106 A1     8/2021   Li et al.
2021/0383238 A1*    12/2021  Jafari ..................... G06N 3/045
2021/0406669 A1     12/2021  Yu et al.

FOREIGN PATENT DOCUMENTS

CN          109102005 B        8/2020
EP          3620997 A1         3/2020

OTHER PUBLICATIONS

Mendes et al., "Multi-Stage Transfer Learning with an Application to Selection Process," arXiv:2006.01276v1, Jun. 1, 2020, 9 pgs. (Year: 2020).*
Caruana et al., "Ensemble Selection from Libraries of Models," Proceedings of the 21st International Conference on Machine Learning, 2004, 8pgs. (Year: 2004).*
Ahn et al., "Variational Information Distillation for Knowledge Transfer," 2019 IEEE/CVF Conference on Computer Vision and Pattern Recognition (CVPR), pp. 9155-9163 (Year: 2019).*
Wang et al., "A Transfer Learning and Progressive Stacking Approach to Reducing Deep Model Sizes with an Application to Speech Enhancement," ICASSP 2017, pp. 5575-5579 (Year: 2017).*
Sarfraz et al., "Knowledge Distillation Beyond Model Compression," arXiv:2007.01922v1, Jul. 3, 2020, 8 pgs. (Year: 2020).*

(Continued)

*Primary Examiner* — Eric J. Bycer
(74) *Attorney, Agent, or Firm* — James L. Olsen

(57)                ABSTRACT

An input model can be received, along with a set of requirements. The set of requirements may describe an output model to be trained. The output model can then be trained. The training of the output model can be based on the input model and based further on at least one intermediate model.

20 Claims, 6 Drawing Sheets

(56)　　　References Cited

OTHER PUBLICATIONS

Dhurandhar et al., "Building Accurate Simple Models with MultiHop," arXiv:2109.06961, submitted Sep. 14, 2021, 12 pages, https://doi.org/10.48550/arXiv.2109.06961 (Grace Period Disclosure).

Bi et al., "A Knowledge-Enhanced Dialogue Model Based on Multi-Hop Information with Graph Attention," Tech Science Press, Computer Modeling in Engineering & Sciences, vol. 128, No. 2, 2021, 24 pages, DOI: 10.32604/cmes.2021.016729.

Dhurandhar, "Explaining the Explainable AI: A 2-Stage Approach," KDnuggets, 2022, 7 pages https://www.kdnuggets.com/2020/10/explaining-explainable-ai.html.

Smith et al., "Eye On A.I.," Artificial Intelligence-Podcast-AI Recruitment-Subscribe-About-Contact, Episode #063, (39:22), © 2019 CSS Media, 2019, 3 pages, https://www.eye-on.ai/podcast-063.

Xue et al., "Recent research trends on Model Compression and Knowledge Transfer in CNNs," 2021 IEEE International Conference on Computer Science, Artificial Intelligence and Electronic Engineering (CSAIEE), 2021, 7 pages, DOI: 10.1109/CSAIEE54046.2021.9543192.

Hinton et al., "Distilling the Knowledge in a Neural Network," ArXiv, 2015, 9 pages, available at https://arxiv.org/abs/1503.02531.

Bastani et al., "Interpreting Blackbox Models via Model Extraction," arXiv preprint arXiv:1705.08504, 2017, 28 pages, available at https://arxiv.org/abs/1705.08504.

Dhurandhar et al., "Improving Simple Models with Confidence Profiles," Advances of Neural Inf. Processing Systems (NeurIPS), 2018, 17 pages, available at https://arxiv.org/abs/1807.07506.

Dhurandhar et al., "Enhancing Simple Models by Exploiting What They Already Know," Intl. Conference on Machine Learning (ICML), 2020, 20 pages, available at https://arxiv.org/abs/1905.13565.

Frosst et al., "Distilling a Neural Network Into a Soft Decision Tree," arXiv preprint arXiv:1711.09784, 2017, 8 pages. available at https://arxiv.org/abs/1711.09784.

Mirzadeh et al., "Improved Knowledge Distillation via Teacher Assistant," In AAAI, 2020, 11 pages, available at https://arxiv.org/abs/1902.03393.

* cited by examiner

Acquire Transfer Regimen
502

Acquire Anchor Model(s)
504

Generate Intermediate
Model(s)
506

Train Output Model via
Regimen
508

MULTIPLE STAGE KNOWLEDGE TRANSFER

STATEMENT REGARDING PRIOR DISCLOSURES BY THE INVENTOR OR A JOINT INVENTOR

The following disclosure is submitted under 35 U.S.C. 102(b)(1)(A): DHURANDHAR et al., "Building Accurate Simple Models with Multi-Hop Knowledge Transfer," arXiv:2109.06961, submitted Sep. 14, 2021, 12 pages.

BACKGROUND

The systems and methods of the present disclosure relate to machine learning knowledge transfer.

Machine learning models have proven to be particularly valuable tools in a wide variety of applications. However, their performance typically comes at a cost; larger, more complex models may be more accurate, but they also usually require more computational resources (e.g., processing power, storage space, etc.) to function.

To address this, techniques were developed to allow a relatively simple model to perform with accuracy that is comparable to a more complex model. This concept is generally referred to as "knowledge transfer" (or transferring knowledge). In short, knowledge transfer techniques aim to take a high-performing but complex model and use it to train a simpler model to behave similarly. As a result, knowledge transfer essentially results in a (relatively) simple model with performance comparable to that of a more complex input model.

The most well-known example of knowledge transfer is likely Knowledge Distillation (KD), which, as its name implies, aims to "distill" the knowledge of a complex model and implement it in a simpler model. Other knowledge transfer techniques also exist, such as model compression, ProfWeight, etc.

SUMMARY

Some embodiments of the present disclosure can be illustrated as a method. The method includes receiving an input model. The method also includes receiving a set of requirements for an output model. The method also includes training the output model based on the input model and on an intermediate.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figures 1A, 1B, 1C:
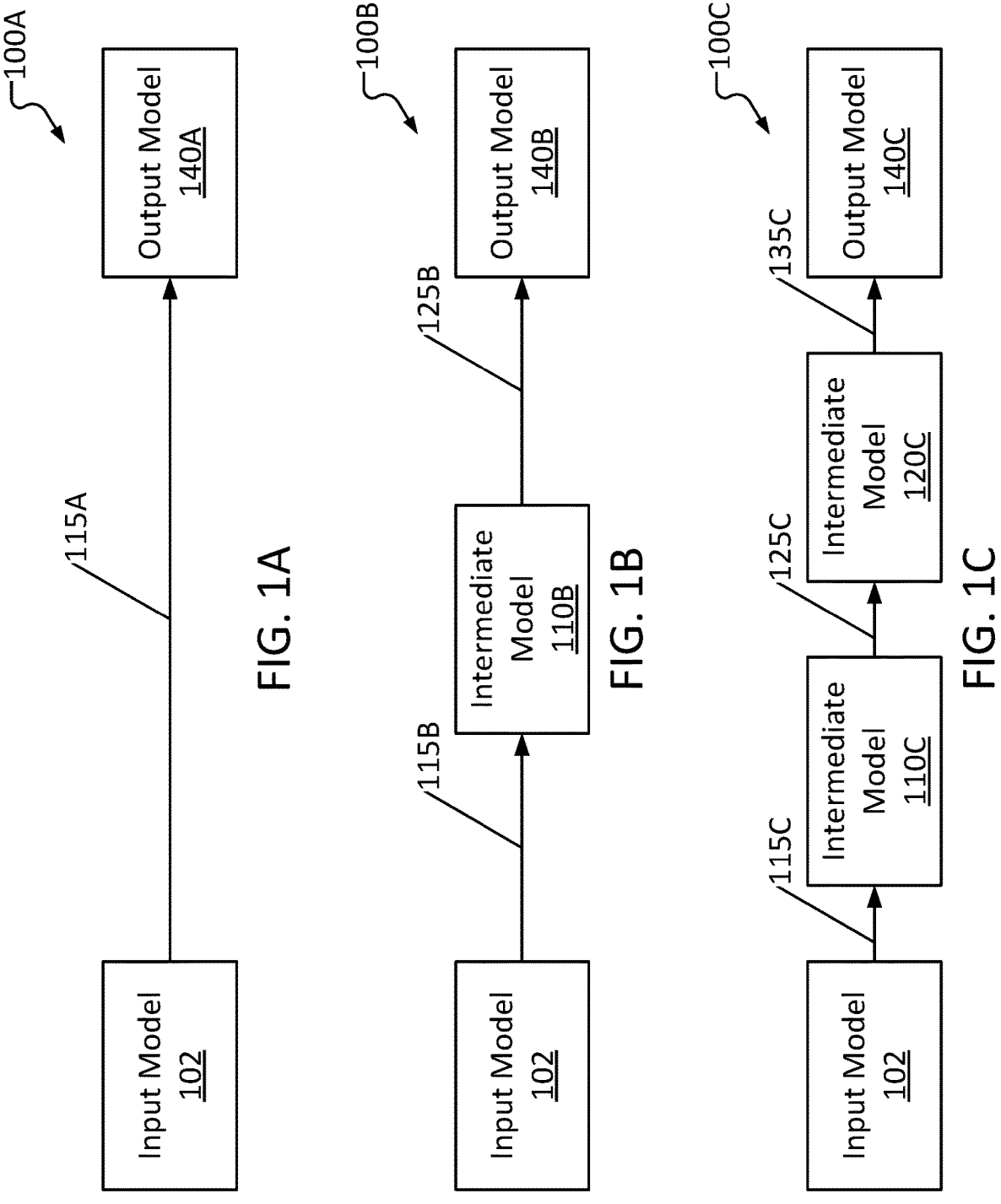
FIG. 1A is a high-level depiction of a single-stage knowledge transfer regimen, consistent with several embodiments of the present disclosure.
FIG. 1B is a high-level depiction of a two-stage knowledge transfer regimen, consistent with several embodiments of the present disclosure.
FIG. 1C is a high-level depiction of a three-stage knowledge transfer regimen, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods for transferring knowledge from a complex model to a simple model. More particular aspects relate to systems and methods to select a transfer regimen for training an output model via transferring knowledge from a more complex input model.

Knowledge can be transferred from an input model to an output model by training the output model based on the input model. For example, inputting the same data to both models, comparing their outputs, and adjusting the output model based on the comparison can, over time, cause the output model to mimic performance of the input model. Even without an understanding how the input or output models work (e.g., even treating the input model as a "black box,"), this way of training the output model can enable the output model to function similarly to the input model. This can be referred to as training the output model "based on" or "using" the input model. Notably, this can work even if the output model is substantially less complex than the input model.

Further, rather than necessarily transferring knowledge directly from an input model into an output model (a process referred to herein as "single-stage" knowledge transfer), systems and methods consistent with the present disclosure advantageously enable potential improvements to output model performance by transferring knowledge through one or more "intermediate models" (a process referred to herein as "multi-stage" knowledge transfer). This can result in an output model with, for example, better accuracy when compared to models trained via "direct" knowledge transfer.

Throughout this disclosure, reference is made to different transfer "regimens." As used herein, a transfer regimen describes several aspects of how knowledge is to be transferred from an input model to an output model. Several variables can be used to define different transfer regimens such as, for example, a number of intermediate models to be utilized, a type of each intermediate model, a knowledge transfer technique between each model in the regimen, etc.

As an illustrative example, a system performing a transfer regimen consistent with the present disclosure might perform knowledge distillation using an input model to train an intermediate model. The system can then perform knowledge distillation using the now-trained intermediate model in order to train an output model. The system may also perform several transfer regimens and compare resulting output models.

In some instances, more than one intermediate model can be utilized for the knowledge transfer. For example, a system may receive an input model, transfer knowledge from the input model to a first intermediate model, transfer knowledge from the first intermediate model to a second intermediate model, and then transfer knowledge from the second intermediate model to an output model.

Notably, performance of an output model can be difficult to predict. As a result, systems and methods consistent with the present disclosure enable selecting multiple different transfer regimens to attempt. Thus, multiple different output models can be trained (each via a different transfer regimen) and compared. However, transferring knowledge via different intermediate models can be resource-intensive, as discussed in further detail below. Therefore, depending upon, for example, customer budget constraints, a customer may only permit a relatively limited number of transfer regimens (for example, five or fewer). As a result, it can be particularly advantageous to make the transfer regimens different from one another, in order to maximize coverage of a search space (discussed in further detail below). For example, a system may utilize different intermediate models for each transfer regimen. A simple way to accomplish this is to modify an intermediate model in order to generate a new intermediate model. For example, a system may apply a perturbation function to a template (referred to as an "anchor model") in order to generate a first intermediate model. The system can apply the same perturbation function to the same anchor model to generate a second, different intermediate model. This way, multiple unique intermediate models can be implemented quickly and efficiently. Further, in some instances, the anchor model itself may be utilized as an intermediate model.

The particular knowledge transfer technique used (e.g., knowledge distillation ("KD"), model compression ("MC"), ProfWeight ("PW"), etc.) does not need to be the same for every step, but can affect outcome. In other words, the example system described above using two stages of knowledge distillation might instead utilize ProfWeight for the second stage (i.e., to train the output model based on the intermediate model), even though the intermediate model was trained via knowledge distillation at the first stage. Notably, the resulting output model may have different performance metrics (could be better or worse) compared to that trained via two stages of knowledge distillation. Thus, these approaches (i.e., "KD & KD" vs. "KD & PW") are distinguished from one another by being described as different transfer regimens, even though they both utilize a single intermediate model.

Machine learning models can take multiple forms (or "types"). For example, a first model type might be a convolutional neural network (CNN), a second model type might be a decision tree, etc. Model type can also impact effectiveness of various knowledge transfer techniques. As an example, a CNN trained via ProfWeight based upon a pre-trained input model might perform better than a CNN trained from the same input model via knowledge distillation. In contrast, a decision tree (which is structured and functions in a significantly different way than a neural network) might benefit more from knowledge distillation than ProfWeight. The type of the input model can also affect performance of the trained output model differently, depending upon knowledge transfer technique.

In a typical knowledge transfer scenario, a relatively complex input model is available (often already trained and functional), and a simpler model is desired. A knowledge transfer technique may then be selected, and the output model that is based on the input model can be trained using the knowledge transfer technique. However, systems and methods consistent with the present disclosure improve upon typical knowledge transfer by enabling multi-stage knowledge transfer regimens. In essence, rather than train an output model directly from an input model, systems and methods consistent with the present disclosure may transfer knowledge from the input model to an intermediate model, and then transfer knowledge from the intermediate model to the output model. In some embodiments, more than one intermediate model can be utilized, as described in further detail below.

The output model may be defined by various requirements, such as a type of the output model, a storage footprint, speed, etc. As an example, a customer may desire an output model which, when given a particular input, can make a given prediction with at least 98% accuracy, despite requiring no more than 10 megabytes (MB) of storage space and/or having fewer than 1,000 parameters. As another example, a customer may require that the output model be a decision tree model, as the customer may wish to analyze the model in order to interpret its "thought process" (as a decision tree's methodology may be substantially easier to interpret than, for example, that of a neural network). Systems and methods consistent with the present disclosure enable leveraging these requirements as search constraints when selecting knowledge transfer regimens (including intermediate models and transfer techniques) to attempt. Notably, transfer regimens including "intermediate models" may yield improved performance when compared to single-stage knowledge transfer regimens.

Training machine learning models is generally resource-intensive (e.g., requires significant amounts of processing power and/or time). As a result, in some use cases, clients may be particularly budget or resource constrained. In such instances, an exhaustive "brute force" approach to evaluating an entire range of possible regimens may not be feasible even with modern computing systems. For example, evaluating every possible regimen may require training several thousand models, which may be in extreme excess of a customer's resource and time budgets. This is a result of how many variables can increase the number of different possible regimens, such as different numbers of intermediate models, different knowledge transfer techniques, and different model types. Any further variables, such as minor differences in intermediate models of otherwise-identical regimens, increase this even further. For example, a first regimen may call for a first intermediate model having four layers. A second regimen may be substantially identical to the first regimen, except the second regimen may call for an otherwise-identical first intermediate model having five layers instead of four. The final models trained by these example regimens may perform differently, and thus customers may wish to evaluate both regimens. However, as noted, depending upon customer constraints, considering such additional variables can result in infeasible amounts of models to train. Thus, systems and methods consistent with the present disclosure also provide ways to enrich the search space, essentially improving efficiency and limiting the number of regimens that a system may need to evaluate before selecting a final output model. Put simply, one could essentially always evaluate more of these regimes, but every regimen evaluated may be a substantial resource investment, so finding a "good enough" regimen quickly may be advantageous.

FIGS. 1A-1C illustrate three different possible transfer regimens (100A, 100B, and 100C) that may be used to transfer knowledge from an input model to an output model. FIG. 1A is a high-level depiction of a single-stage knowledge transfer regimen 100A, consistent with several embodiments of the present disclosure. Regimen 100A includes an input model 102 used to train an output model 140A via a first knowledge transfer technique 115A.

Input model 102 may be an existing, fully-trained model, such as common commercially-available models. For example, in some instances DenseNet169 may be utilized as input model 102. In some instances, input model 102 may be untrained, but may be provided alongside a training dataset.

Input model 102 may be trained to perform a desired task based on received input data. For example, in some instances, input model 102 may be trained to receive an input image and identify shapes or objects within the input image (e.g., vehicles, animals, etc.). In some instances, input model 102 may be trained to receive an input block of text, such as a news article, and classify a tone of the block of text (e.g., whether a reader of the text might view the text as confident, fearful, joyful, etc.).

One or more performance metrics may also be associated with input model 102. For example, an accuracy of input model 102 may be known (or may be assessed based upon test data). Additional examples of performance metrics may include storage footprint, processing speed, rates of false positive/negative classifications, etc. Performance metrics can be useful for comparison when evaluating output model 140A.

Knowledge transfer technique 115A could be any of a variety of known techniques. For example, knowledge transfer technique 115A could be knowledge distillation, in which case output model 140A may be trained from input model 102 via knowledge distillation. As another example, output model 140A may be trained based on input model 102 via model compression (meaning technique 115A is "model compression").

Output model 140A's model type may depend upon received constraints; for example, output model 140A's model type may be selected by a user of a system implementing 100A. As an example, in some instances, a customer requesting output model 140A may require output model 140A to be a decision tree, and in response, a proprietor of the system implementing 100A may set output model 140A to be a decision tree.

FIG. 1B is a high-level depiction of a two-stage knowledge transfer regimen 100B, consistent with several embodiments of the present disclosure. Two-stage regimen 100B may be a second regimen analyzed by a system consistent with the present disclosure, such as a system tasked with transferring knowledge from an input model to an output model. As shown, regimen 100B includes input model 102 and an output model 140B, but also includes an intermediate model 110B. Input model 102 may be the same input model as that depicted in FIG. 1A, but output model 140B may be different from output model 140A (though both output models may still meet performance constraints set by a customer).

In regimen 100B, knowledge may be transferred from input model 102 to intermediate model 110B via first stage knowledge transfer 115B. Knowledge transfer 115B may utilize a known knowledge transfer technique such as, for example, model compression, ProfWeight, knowledge distillation, etc. The specific technique used for transfer 115B may depend upon several factors. For example, in some instances, the technique of transfer 115B may be selected based upon a model type of input model 102, intermediate model 110B, or even output model 140B. This selection can be based upon knowledge of technique and model type compatibility; for example, if input model 102 is a neural network and intermediate model 110B is a support vector machine, a system evaluating regimen 100B may utilize knowledge distillation for transfer 115B.

Transfer 115B may utilize the same knowledge transfer technique as 115A, but this may not be necessary; in some instances, the two may use different techniques. Further, in some instances, a technique of transfer 115B may be specifically selected to be different from the technique of transfer 115A. This can help to enrich a search space of a system attempting to evaluate multiple training regimes. This can be particularly useful as some knowledge transfer techniques may perform particularly well in certain situations and/or particularly poorly in other situations. For example, a technique may be particularly effective (relative to other techniques) at transferring knowledge from a first type of model to a second type of model, but that same technique may be relatively ineffective at transferring knowledge from the first type of model to a third type of model. Thus, the choice of techniques, in some instances, may be determined by the type of models being trained from/training. For example, the technique of 125C may be completely dependent on what type of models 110C and 120C are.

Some general trends may be known or discovered over time. For example, ProfWeight may be better than knowledge distillation for transferring knowledge to an output model that is significantly simpler than the input model. However, in many instances, it can nonetheless be particularly difficult to predict which technique might be best for a given situation. Therefore, if a certain knowledge transfer technique may be particularly effective for the specific requirements of the system (e.g., requirements of a customer requesting output model 140B), it can benefit to attempt as many knowledge transfer techniques as possible (to increase the chance of utilizing the "best" knowledge transfer technique). Of course, this logic also applies in reverse; trying various knowledge transfer techniques also risks utilizing the "worst" knowledge transfer technique at some point, but depending upon implementation, this risk may be considered worthwhile for some systems.

Intermediate model 110B may be a model selected from a library of existing models. In general, intermediate model 110B may be "less complex" than input model 102, but more complex than output model 140B. Of course, given that models 102, 110B, and 140B may all have different model types, complexity may be difficult to measure exactly. However, metrics such as a number of layers, a storage footprint, and the like may be utilized to roughly estimate complexity of the model.

In some instances, intermediate model 110B may be a simpler version of input model 102. As an example, input model 102 may be ResNet-50, while intermediate model 110B may be ResNet-40 (a less complex version of the same model). As another example, input model 102 may be a DenseNet-169, while intermediate model 110B may be a DenseNet created with fewer layers.

Once intermediate model 110B is trained, knowledge is transfer from intermediate model 110B to output model 140B via a second-stage knowledge transfer 125B. In general, the technique used for knowledge transfer 125B may be selected in a substantially similar manner as that of transfer 115B; the selection may be based on a model type of intermediate model 110B, output model 140B, or input model 102. The technique may also be selected based upon the technique of transfer 115B, or even techniques used in other regimes, such as that of transfer 115A (or 115C, 125C, or 135C).

Knowledge transfer 125B results in a trained output model 140B. Notably, output model 140B may have different performance metrics when compared to output model 140A. For example, output model 140B may be more accurate at classifying input data than output model 140A. Output model 140B may have a model type and complexity dictated by requirements, such as those received from a customer. As a result, output model 140B may appear superficially similar to output model 140A (and output model 140C); for example, the output models may all be decision trees with fifteen layers. However, the functionality of the output models may vary due to how they were trained. In short, output model 140B may have more of the "knowledge" from input model 102 than output model 140A, largely due to use of intermediate model 110B in regimen 100B. This is not always the case; in some instances, output model 140A may perform better than output model 140B. However, in practice, intermediate models (such as 110B) frequently result in better-performing output models, and thus systems and methods consistent with the present disclosure may advantageously analyze multiple possible regimens in order to transfer knowledge from an input model to an output model.

FIG. 1C is a high-level depiction of a three-stage knowledge transfer regimen 100C, consistent with several embodiments of the present disclosure. Three-stage regimen 100C may generally be acquired in a manner substantially similar to regimen 100B, but with two intermediate models (110C and 120C) rather than regimen 100B's single model 110B. In some instances, elements of regimen 100C (e.g., techniques of knowledge transfers 115C, 125C, and 135C, types of intermediate models 110C, 120C, etc.) may generally be selected based on considerations similar to those discussed above with reference to regimen 100B. As an example, a type of intermediate model 110C may be selected based upon a type of input model 102 and/or a type of output model 140C. As an additional example, a technique used in knowledge transfer 115C may be selected based upon a type of intermediate model 115C, the type of input model 102, and/or techniques that have not yet been part of any regimen evaluated by a system tasked with training the output model.

Notably, first intermediate model 110C and second intermediate model 120C may have different model types. For example, first intermediate model 110C may be a neural network, while second intermediate model 120C may be a support vector machine. In general, intermediate model 120C may be more complex than output model 140C, but simpler than intermediate model 110C (which may in turn be simpler than input model 102). In this manner, knowledge is transferred from more complex models to simpler models, but more gradually than the direct transfer of regimen 100A.

Figure 2:
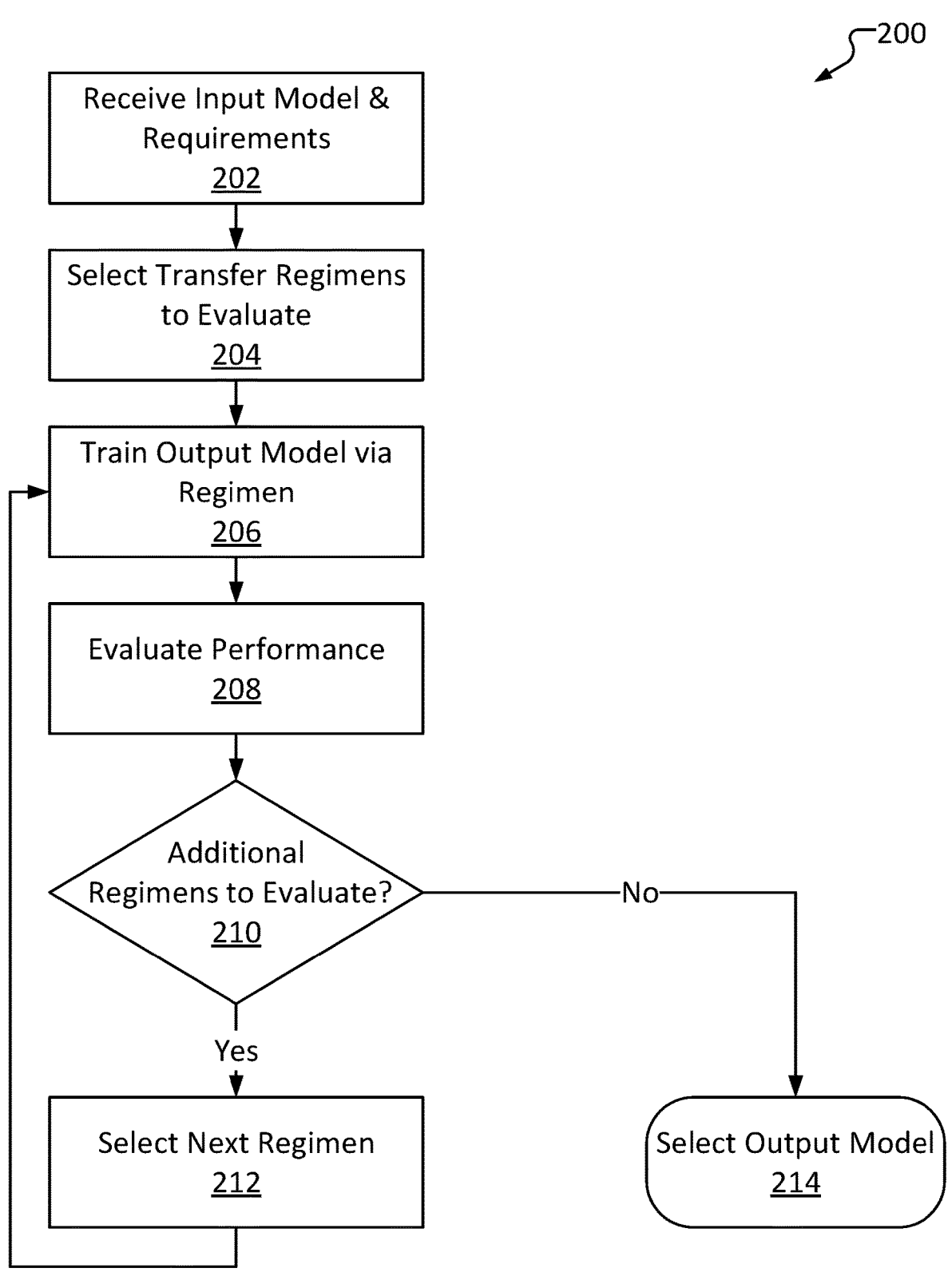
FIG. 2 is a high-level method for multi-stage knowledge transfer, consistent with several embodiments of the present disclosure.

FIG. 2 is a high-level method 200 for multi-stage knowledge transfer, consistent with several embodiments of the present disclosure. Method 200 may be performed by, for example, a system configured to transfer knowledge from an input model to an output model. Method 200 comprises receiving an input model and requirements for an output model at operation 202. The input model may be an existing and/or pretrained model, such as a publicly available neural network. In receiving the requirements, operation 202 may include receiving user input dictating constraints for an output model.

As an example, a user may indicate a maximum storage footprint the output model may require, a maximum duration of time the output model may be permitted to require for processing inputs, a minimum accuracy of the output model, etc. Such constraints can guide performance of other operations of method 200. For example, in some instances, a model type of the output model may be selected (at operation 204, discussed below) based upon a storage footprint, as some model types require less storage space than others.

In some instances, the requirements received via operation 202 can refer to the training process itself. For example, a customer may need to pay for an output model based upon the resources/server time required to train it output model. As a result, the customer may wish to limit how many regimens might be evaluated (with the understanding that this can impact performance of the final output model). Therefore, requirements received via operation 202 may specify a maximum number of regimens to evaluate.

Method 200 further comprises selecting transfer regimens to evaluate at operation 204. Operation 204 may include, for example, selecting regimens from a predetermined list. For example, in some instances, a system performing method 200 may have recorded regimens that yielded particularly high-performance models (in terms of accuracy, storage footprint, and/or other metrics) in the past. Such a list could enable the system to select, via operation 204, one or more of these regimens to evaluate.

However, even if a given regimen, utilizing a first input model, may yield a first output model with relatively high performance metrics, this does not necessarily mean the regimen will always produce high-performance output models. For example, the same regimen, utilizing a second input model, may yield a second output model with relatively poor performance metrics (e.g., slow speed, low accuracy, large storage footprint, etc.). Further, a different regimen, given the same input models, may produce the opposite results (e.g., a poor first output model but a high-performance second output model). Thus, selecting a regimen from a list of previously successful regimens is not necessarily the preferred approach. Instead (or in addition), in some instances, operation 204 may include generating regimens to evaluate.

In generating regimens to evaluate, operation 204 may be described in terms of three component steps: identifying a search space of possible transfer regimens (including various types and numbers of models, as well as transfer techniques), determining a number of regimens to evaluate, and generating/selecting that number of specific regimens within that search space for evaluation.

A "search space" refers to a distribution of possible transfer regimens. This search space can be defined by various constraints, including those received from a user and/or customer. For example, in identifying a search space, operation 204 may include identifying a range of possible intermediate model counts (e.g., 0-3, 2-4, 1-2, etc.). The range of possible intermediate model counts can be identified based upon customer requirements. In general, more intermediate models may require additional resources to evaluate/implement, but may also provide increased performance of the final output model. However, adding more intermediate models may yield diminishing returns, so many systems may limit the number of intermediate models per transfer regimen even if higher numbers of intermediate models may still provide slight accuracy improvements.

Further, identifying the search space at operation 204 may also include identifying candidate model types for intermediate models. For example, a system performing method 200 for a first customer may evaluate regimens with intermediate models in the form of decision trees, neural networks, and support vector machines. However, the system performing method 200 for a second customer may only evaluate regimens with neural networks and support vector machines for intermediate models (i.e., without evaluating regimens including decision tree intermediate models), as the second customer may have specified that decision tree models are not to be included in the regimen. Such a specification can be received via operation 202.

Operation 204 may also include identifying candidate knowledge transfer techniques to utilize in transferring knowledge between the various models (input, intermediate, and output) in order to further constrain the search space. In some instances, these constraints may be determined based on a stored library of possible techniques etc. For example, a library may list seven knowledge transfer techniques, and operation 204 may include selecting four of the seven types at random (as selecting all seven may not constrain the search space enough/may require too many resources to evaluate). In some instances, these constraints may be determined based upon user input. Such a library may also list model types, which can be used in selecting intermediate models. In some instances, the library may include a selection of anchor models, which can be perturbed or mutated to produce intermediate models, as discussed in further detail below.

As noted, in some instances, operation 204 may include determining a number of regimens to evaluate. This number can be based upon budget constraints, which may take the form of monetary budget, computational budget, time budget, etc. For example, in some instances a system performing method 200 may not have sufficient computing power and/or time to train dozens of models in order to transfer knowledge to the output model, and thus may be limited to four or five regimens (each regimen having two or three intermediate models).

Once the search space is defined, regimens may be generated from within the search space. For example, a system performing method 200 may select, for each regimen, a number of intermediate models, a type for each intermediate model, an order of the intermediate models, and a transfer technique between each model and its subsequent model. As an example, a system performing method 200 may determine that it has enough resources to evaluate three different regimens, and as a result, the system may generate three regimens from its search space of possible regimens. For example, the system may generate a first regimen including a direct/single-stage knowledge transfer (with no intermediate models), a second regimen including a two-stage knowledge transfer using one intermediate model, and a third regimen including a three-stage knowledge transfer using two intermediate models. As part of this generation, the system may determine specifics such as a model type of the intermediate model(s) (if any) as well as a knowledge transfer technique for each stage of the transfer. Regimens 100A-100C, discussed above with reference to FIGS. 1A-1C, respectively, are example regimens that may be determined via operation 204.

Method 200 further comprises training, at operation 206, an output model via one of the regimens that were selected for evaluation at operation 204. Operation 206 may be performed once for each regimen selected via operation 204. For example, given a regimen including two intermediate models, operation 206 may include training a first intermediate model based on the input model, then training a second intermediate model based on the first intermediate model, and then training the output model based on the second intermediate model. Each training step of the regimen may be performed utilizing a specific knowledge transfer method as outlined by the regimen.

For each particular regimen, operation 206 may similarly include transferring knowledge from the input model to the output model via the intermediate model(s) (if any) using the knowledge transfer technique(s) outlined in the regimen. As an example, a regimen may include training a single intermediate model, such as a support vector machine, based on the input model via knowledge distillation. The regimen may also specify that model compression should be used to transfer knowledge from the intermediate model to the output model. This example regimen is one possible instance of regimen 100B discussed above with reference to FIG. 1B, where knowledge transfer 115B is knowledge distillation, intermediate model 110B is a support vector machine, and knowledge transfer 125B is model compression.

Method 200 further comprises evaluating performing of the trained output model at operation 208. Operation 208 may depend in part upon the requirements for the output model (i.e., those received at operation 202). For example, a customer may require an output model that can classify an input image with an accuracy of 85%. In such a situation, operation 208 may include submitting multiple known test images to the output model and determining an accuracy of the output model. As another example, the customer may require an output model with an accuracy within 5% of the input model. In such a situation, operation 208 may include inputting a series of test images to the input model, receiving classifications of the test images from the input model, inputting the same test images to the output model, receiving classifications of the test images from the output model, and comparing the sets of classifications to determine whether the output model's accuracy is within 5% of the input model's accuracy. As a third example, the customer may require that the output model consumes 50% less storage space than the input model, while maintaining accuracy within 15% of the input model. In such a situation, operation 208 may include evaluating both accuracies as described above in addition to checking the storage footprint of the output model. Other constraints can include, for example, speed (how long the output model requires to produce a result), resource costs (how much processing power the output model requires to produce a result), etc.

Method 200 further comprises determining, at operation 210, whether additional regimens remain to be evaluated. Operation 210 may simply include checking whether any of the regimens determined via operation 204 have yet to be evaluated. A regimen determined via operation 204 may be denoted as "evaluated" during any of operations 206 to 210. As an example, upon initiating training/knowledge transfer at operation 206 in accordance with a particular regimen, a system performing method 200 may indicate that the regimen is being evaluated, such as by setting an indicator bit in a data structure.

If additional regimens remain (210 "Yes"), method 200 proceeds to selecting another regimen at operation 212. Method 200 then returns to operation 206, in which method 200 trains a new copy of the output model via the newly-selected regimen, and then evaluates performance of the new output model at operation 208.

Once all regimens have been evaluated (210 "No"), method 200 concludes by selecting an output model at operation 214. In some instances, when a second output model's performance is evaluated via a second iteration of operation 208, it may be compared to the first output model's performance, and the model with worse performance may be deleted to save storage space. In other instances, each trained output model may be stored, which can allow a user to select which output model to implement. This can be advantageous, as the performance of an output model may have multiple factors (depending in part upon requirements received at operation 202), so there may not be an objective "best" output model. Thus, a user and/or customer may wish to weigh their options.

As an example, a first output model may correctly classify an input image more frequently than a second output model, but its errors may be significant. In contrast, the second output model may only make relatively minor errors, even if they are more frequent. As a more specific example, given several images depicting a person on a city street, a first model may correctly detect the person 98% of the time, but may incorrectly identify the person as a cloud the other 2% of the time. In contrast, given the same images, a second model may correctly identify the person as a person 95% of the time, but may incorrectly identify the person as a deer the other 5% of the time. Given a choice between the two, a smart vehicle sensor system may prefer the second model, as the "cloud" mistake may result in dangerously misinformed driving decisions (such as failing to avoid a person in a road), while mistaking a person for a deer may be essentially harmless (as the vehicle will know to avoid the person even if the vehicle thinks the person is a deer). In contrast, a system tracking attendance at a venue may prefer the first model, as the only metric that matters to it may be accurately detecting whether a person has entered the venue or not. Thus, some users may opt for a more-frequently-correct first output model, while other users may prefer a less-frequently-catastrophically-incorrect second output model. To accommodate this, in some instances, operation 214 may include presenting a list of each trained output model alongside various performance-related statistics measured via operation 208 (e.g., storage footprint, accuracy, standard deviation, etc.).

Figure 3:
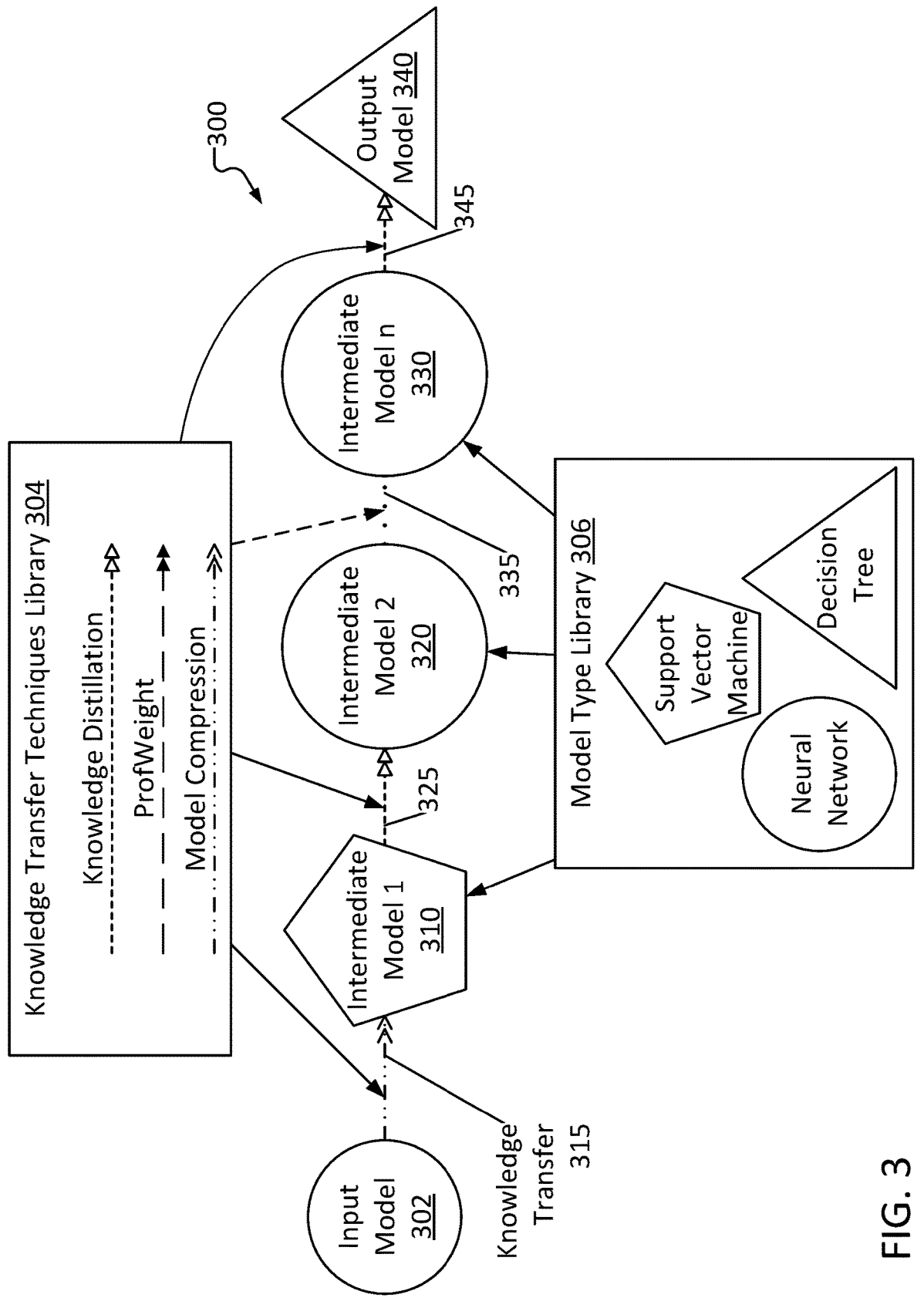
FIG. 3 is a diagram illustrating how an example knowledge transfer regimen may be acquired, consistent with several embodiments of the present disclosure.

FIG. 3 is a diagram illustrating how an example knowledge transfer regimen 300 may be acquired, consistent with several embodiments of the present disclosure. FIG. 3 is provided as an illustrative example of various elements that can differ between regimens, particularly model types, knowledge transfer techniques, and number of intermediate models.

At a high level, FIG. 3 depicts models of various types as shapes, where a type of a given model is indicated by the shape used in FIG. 3. For example, FIG. 3 shows five models in regimen 300: Input model 302, intermediate model 1 (310), intermediate model 2 (320), a possible intermediate model "n" 330, where n can represent one or more additional intermediate models, and output model 340. Several of these models are of differing types, which are mapped via model type library 306. For example, input model 302 is depicted in FIG. 3 as a circle, which model type library 306 shows is a "neural network." Output model 340 is a triangle, which library 306 shows corresponds to a "decision tree." Therefore, regimen 300 describes transferring knowledge from a neural network (302) to a decision tree (340) via several intermediate models (310, 320, and 330). Intermediate model 310's pentagon shape indicates that it is a "support vector machine," while intermediate model 320 and 330 both have circular shapes, indicating that they are neural networks.

In FIG. 3, knowledge transfer techniques are represented by different types of line dashing and arrows, as shown in knowledge transfer technique library 304. For example, regimen 300 includes a knowledge transfer 315 from input model 302 to first intermediate model 310. As seen in FIG. 3, first-stage knowledge transfer 315 is depicted as a "dash-dot-dot" line with two "chevron"-style arrows. As shown in library 304, this indicates that knowledge transfer 315 is "model compression." Thus, regimen 300 calls for performing model compression on input model 302, resulting in intermediate model 310. Similarly, second-stage knowledge transfer 325 and final-stage knowledge transfer 345 are both "half-dash" lines with two open triangular arrows, indicating that they are "knowledge distillation" transfers. Regimen 300 may include one or more additional intermediate models, which is represented by the ellipsis shown at 335. If additional intermediate models are added to regimen 300, then they may have their own knowledge transfers added as well.

Figure 4:
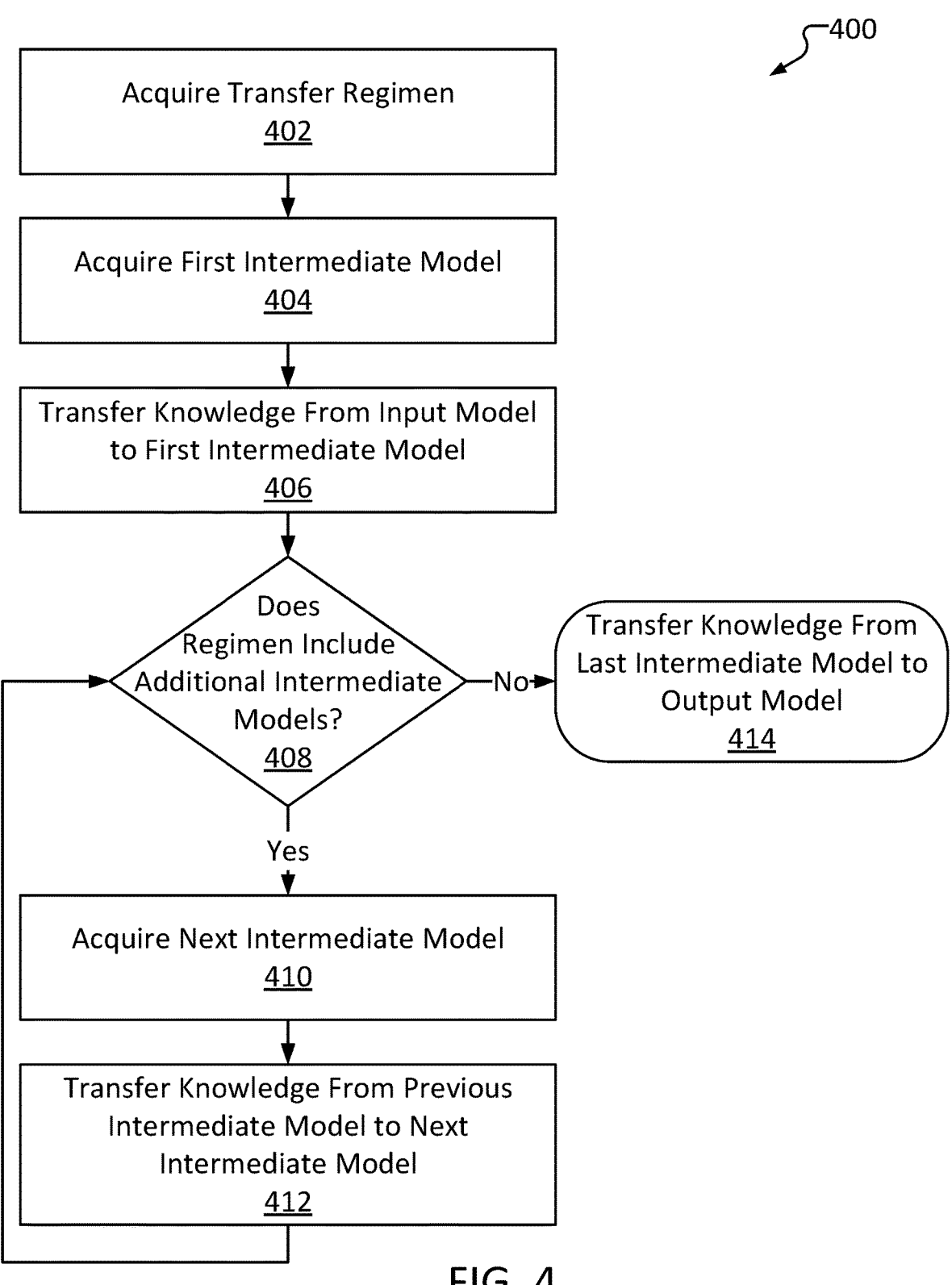
FIG. 4 is a method of transferring knowledge from an input model to an output model via one or more intermediate models, consistent with several embodiments of the present disclosure.

FIG. 4 is a method 400 of transferring knowledge from an input model to an output model via one or more intermediate models, consistent with several embodiments of the present disclosure. In essence, while method 200 describes (in part) evaluating multiple regimens, method 400 describes how each regimen may be evaluated in more detail.

Method 400 comprises acquiring a transfer regimen at operation 402. In some instances, operation 402 may include selecting a transfer regimen from a previously-determined set of transfer regimens to be evaluated. For example, the transfer regimen may have been one of several regimens generated from a search space by a system performing operation 204 of method 200, described with reference to FIG. 2, above.

Method 400 further comprises acquiring a first intermediate model at operation 404. Operation 404 may include, for example, checking the regimen to determine a type of the intermediate model. In some instances, the regimen may specify an exact model to be used for any or all of the intermediate models; for example, the regimen may indicate that the first intermediate model is to be a ResNet-40 model. In some instances, the regimen may indicate that the first intermediate model is to be generated based on an anchor model. For example, operation 404 may include selecting an anchor model (to be used as a template) and generating the first intermediate model by applying random perturbations to the anchor model (as described in further detail below with reference to FIG. 5).

Method 400 further comprises transferring knowledge from the input model to the intermediate model at operation 406. Operation 406 may include, for example, utilizing a knowledge transfer technique such as knowledge distillation, model compression, ProfWeight, etc. The particular knowledge transfer technique implemented at operation 406 can be specified by the regimen. In some instances, the regimen may indicate that a system performing method 400 should select a random technique from an existing list of techniques. In some instances (for example, instances in which method 400 is being performed as part of performing method 200), the regimen may indicate that the system should select a technique that has not yet been utilized (for example, a technique not yet performed over the course of method 200). In some similar instances, the regimen may indicate that the system should select a technique that has been attempted the least.

Method 400 further comprises determining whether the regimen includes any additional intermediate models at operation 408. Operation 408 may include, for example, checking the regimen to identify whether the intermediate model that was just trained (at operation 406) is the final intermediate model indicated by the regimen.

If the regimen indicates that one or more additional intermediate models need to be trained (408 "Yes"), method 400 further comprises acquiring a next intermediate model at operation 410. Operation 410 may be performed in a substantially similar manner to operation 404. For example, a system performing method 400 may check the regimen to determine a type of the next intermediate model, and so on.

Method 400 further comprises transferring knowledge from the previous intermediate model to the next intermediate model at operation 412. To be clear, the "next" intermediate model refers to the intermediate model acquired via operation 410, and the "previous" intermediate model refers to the model preceding the "next" model. As an example, assuming the regimen calls for three intermediate models, operation 412 may include transferring knowledge from the first intermediate model to the second intermediate model or from the second intermediate model to the third intermediate model. As with operation 406, operation 412 may include checking the regimen for guidance regarding a technique to be utilized for transferring knowledge from the previous model to the next model. In some instances, a system performing method 400 may select a different technique from that utilized at operation 406 (or that utilized at an earlier iteration of operation 412). Once the next intermediate model is trained, method 400 returns to operation 408 to continue iterating until all intermediate models called for by the regimen have been implemented.

Once there are no more intermediate models left to train (408 "No"), method 400 further comprises transferring knowledge from the final intermediate model to the output model at operation 414. Operation 414 may be performed in a substantially similar manner to operation 406 and/or operation 412. For example, the regimen may specify a knowledge transfer technique to utilize for operation 414, one may be selected at random, or one may be selected based on earlier techniques.

By performing method 400, a system is enabled to transfer knowledge from an input model to an output model via one or more intermediate models. As discussed above, experimental results have shown that use of one or more intermediate models in knowledge transfer frequently can result in improved performance of the output model when compared to "direct transfer" techniques.

Figure 5:
FIG. 5 is a method for generating intermediate models from anchor models, consistent with several embodiments of the present disclosure.
Figure 5:
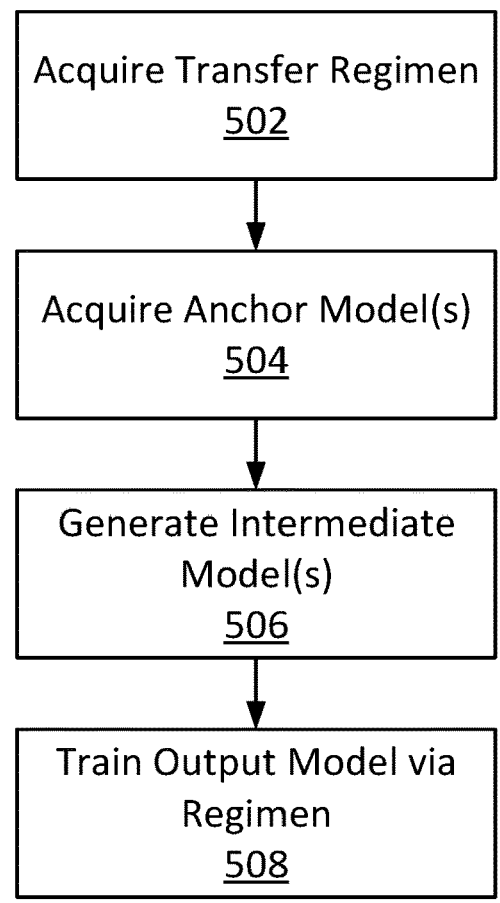

FIG. 5 is a method 500 for generating intermediate models from anchor models, consistent with several embodiments of the present disclosure. An anchor model is a model that is used as a template for generating intermediate models. For example, in some instances, an existing commercial model such as ResNet40 may be selected as an anchor model. In order to cover a broader spectrum of transfer regimens, the system may then generate several intermediate models based on the selected ResNet40 model. For example, the system may apply a random perturbation function to the selected ResNet40 model in order to generate a first intermediate model. The random perturbation function could, for example, adjust values of the ResNet40 model such as one or more weights, connections, etc., so the first intermediate model may be a modified copy of the anchor ResNet40 model. The system may then apply the function to the ResNet40 model again to generate a second, different intermediate model. This way, the system performing method 500 can efficiently provide broad coverage of the search space of transfer regimens.

Method 500 comprises acquiring a transfer regimen at operation 502. In some instances, operation 502 may include selecting a transfer regimen in a substantially similar manner to operation 402 of method 400. In some instances, operation 502 may include generating a transfer regimen in a substantially similar manner to operation 204 of method 200. The transfer regimen may identify one or more types of intermediate models to be utilized for multi-stage knowledge transfer.

Method 500 further comprises acquiring one or more anchor models at operation 504. In some instances, operation 504 may include selecting anchor models from a library of anchor models. Such a selection may be based on types of the models. For example, a library may include an anchor neural network, an anchor support vector machine, and an anchor decision tree. In such an example, a regimen may call for an intermediate neural network. As a result, operation 504 may include selecting the anchor neural network. In some instances, if multiple intermediate models are outlined by the regimen, operation 504 may include selecting an anchor model for each intermediate model. For example, a first anchor model may be used to generate a first intermediate model, and a different, second anchor model may be used to generate a second intermediate model. In some instances, operation 504 may include selecting an anchor model for each intermediate model type (as opposed to each individual model). For example, an anchor neural network may be used to generate a first intermediate neural network and a second intermediate neural network (i.e., both intermediate neural networks may be generated based on perturbations of the same anchor model), while an anchor decision tree may be used to generate an intermediate decision tree. As an additional example, in some instances, an anchor neural network may be used as a first intermediate neural network (i.e., without making any perturbations/modifications to the anchor model), and the anchor neural network may also be modified to generate a second intermediate neural network.

Method 500 further comprises generating, at operation 506, one or more intermediate models based on the anchor model(s) selected at operation 504. Operation 506 may include, for example, applying a perturbation function to the anchor model to randomly modify aspects of the anchor model. As an illustrative example, a neural network such as DenseNet or MobileNetV2 may be composed of various sub-blocks, which in turn may be formed by a group of layers. A perturbation function in such an example may vary hyperparameters specific to a sub-block, such as a number of times the sub-block is repeated. As another example, the perturbation function may adjust weights of a neural network by various amounts. As a result, the perturbed anchor model may behave differently than the original (i.e., unperturbed) anchor model. This perturbed anchor model can be utilized as an intermediate model.

Method 500 further comprises, at operation 508, transferring knowledge to an output model via one or more intermediate models as outlined in the transfer regimen. Operation 508 may be performed in a substantially similar manner to operation 206 of method 200, discussed above with reference to FIG. 2. As an example, operation 508 may include training an intermediate model based on an input model via knowledge distillation, and then training the output model based on the (now-trained) intermediate model via model compression.

As described above, multiple intermediate models can be generated from the same anchor model. In some embodiments of the present disclosure, an anchor model itself can also be utilized as an intermediate model (i.e., without perturbation/modification). However, as described above, many transfer regimens may require multiple intermediate models, and utilizing different models for each regimen can advantageously enable broader coverage of the search space. In other words, in some instances, systems and methods consistent with the present disclosure can benefit from implementing a large number (e.g., 20 or more) of unique intermediate models. In addition, such large numbers of unique anchor models can, depending upon customer constraints, be resource-prohibitive to acquire (for example, the anchor models may be architectures that are well-known to perform well in knowledge transfer, but sufficient quantities of unique architectures may not be readily available). Thus, generating intermediate models via repeated random perturbations of a relatively small set of anchor models can advantageously provide a diverse set of intermediate models in a cost-efficient manner.

Figure 6:
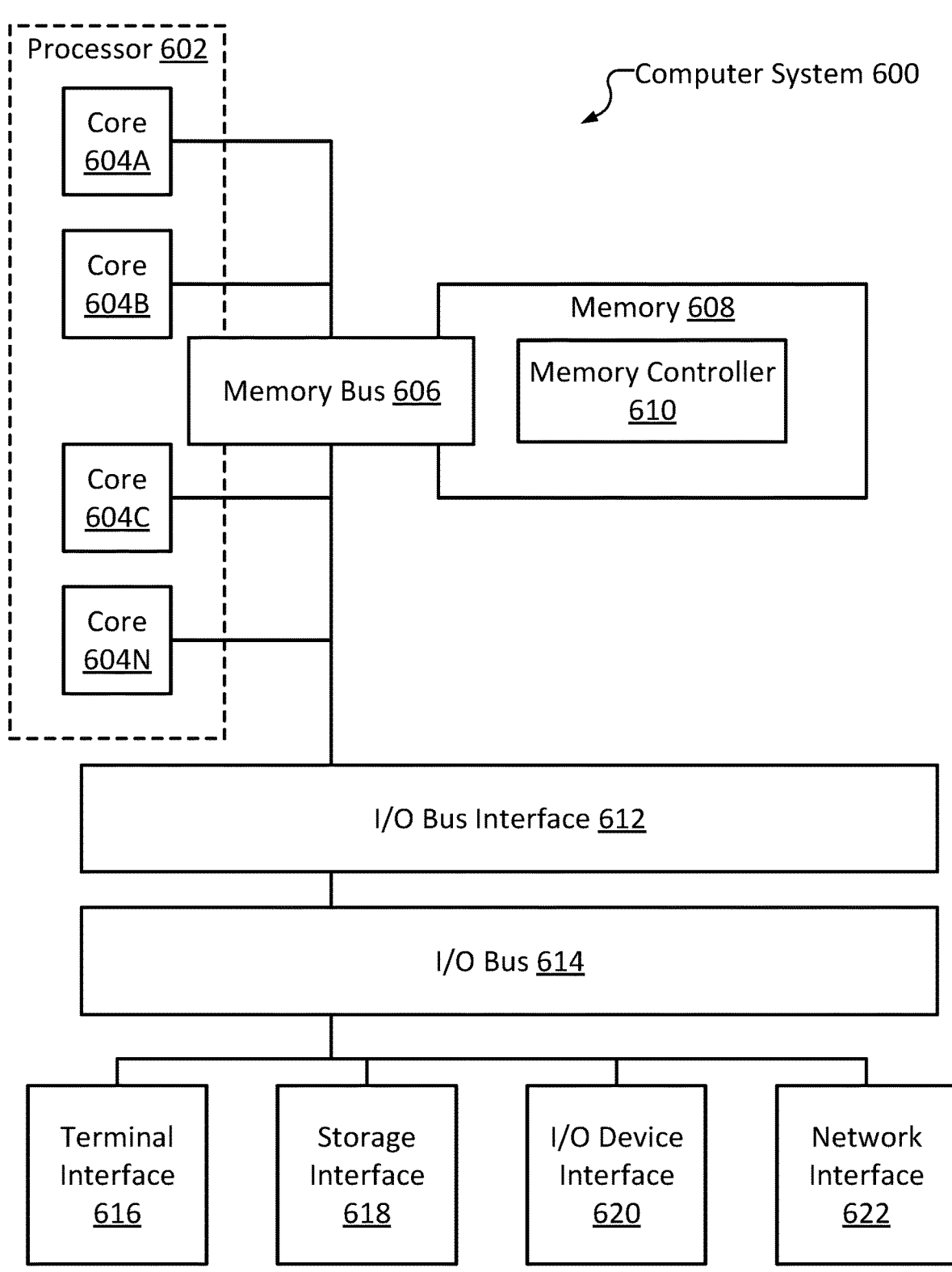
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, methods 200, 400, and/or 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

What is claimed is:

1. A method comprising:
   receiving an input model and a set of requirements for an output model, wherein the set of requirements for the output model includes an accuracy requirement for the output model;
   selecting a plurality of transfer regimens to evaluate, wherein respective ones of the plurality of transfer regimens include a respective first intermediate model for training a respective output model, wherein training the respective output models using the respective ones of the transfer regimens is based on the input model and the respective first intermediate models;

training the respective output models using the respective ones of the plurality of transfer regimens, each of the respective ones of the plurality of transfer regimens including a respective first transfer technique used to transfer knowledge from the input model to the respective first intermediate model and a respective second transfer technique used to transfer knowledge from the respective first intermediate model to the respective output model;

evaluating performance of the respective output models based on the set of requirements including the accuracy requirement;

determining that a first output model of the respective output models trained using a first transfer regimen satisfies the set of requirements including the accuracy requirement and outperforms other respective output models with respect to the accuracy requirement; and selecting the first output model for use in a first application.

2. The method of claim 1, wherein the set of requirements further include a maximum storage footprint of the output model and a maximum duration of time the output model is permitted to process inputs, wherein the first output model satisfies the maximum storage footprint and the maximum duration of time the output model is permitted to process inputs.

3. The method of claim 1, wherein the input model is a first model type, wherein the respective first intermediate model of the first respective transfer technique is a second model type, and wherein the respective output model trained using the respective first transfer technique is a third model type.

4. The method of claim 3, wherein the respective first transfer technique of the first transfer regimen is selected based on the first model type of the input model and the second model type of the first respective intermediate model.

5. The method of claim 4, wherein the respective second transfer technique of the first transfer regimen is selected based on the second model type of the first respective intermediate model and the third model type of the respective output model trained using the first respective transfer technique.

6. The method of claim 4, wherein the first model type of the input model is a neural network, wherein the second model type of the respective first intermediate model is a support vector machine, and wherein the first transfer technique is selected as knowledge distillation based on the input model being the neural network and the first intermediate model being the support vector machine.

7. The method of claim 6, wherein the respective second transfer technique of the first transfer regimen is model compression.

8. The method of claim 1, wherein a number of the plurality of transfer regimens to evaluate is determined based on a computing resource limitation.

9. The method of claim 1, wherein a subset of the plurality of transfer regimens to evaluate are selected from a predetermined list, wherein the predetermined list includes past transfer regimens associated with respective output models.

10. The method of claim 9, wherein the subset is selected from the predetermined list based on the past transfer regimens associated with respective models being high-performance.

11. The method of claim 1, wherein the first transfer regimen includes a second intermediate model between the respective first intermediate model and the respective output model, wherein the second transfer technique is used to transfer knowledge from the respective first intermediate model to the second intermediate model instead of the respective output model, wherein a third transfer technique is used to transfer knowledge from the second intermediate model to the respective output model.

12. The method of claim 1, wherein a second transfer regimen used to train a second output model includes a second intermediate model and a third intermediate model in between the respective first intermediate model and the second output model.

13. The method of claim 12, wherein a first accuracy of the second transfer regimen exceeds a second accuracy of the first transfer regimen, wherein the first output model is selected for use in the first application instead of the second output model due to the first output model being trained on fewer intermediate models than the second output model.

14. The method of claim 1, wherein the first application is image classification, and wherein the accuracy requirement is an image classification accuracy requirement.

15. The method of claim 14, wherein the first output model is used for image classification for a smart vehicle sensor system.

16. The method of claim 14, wherein the respective first intermediate model is generated by applying a perturbation function to an anchor model.

17. The method of claim 1, further comprising: providing a list of performance metrics for each respective output model.

18. The method of claim 17, wherein the list of performance metrics for each respective output model includes a storage footprint metric, an accuracy metric, and a processing time metric.

19. A system comprising:

a processor set;

one or more computer readable storage media; and program instructions stored on the one or more computer readable storage media to cause the processor set to perform operations comprising:

receiving an input model and a set of requirements for an output model, wherein the set of requirements for the output model includes an accuracy requirement for the output model;

selecting a plurality of transfer regimens to evaluate, wherein respective ones of the plurality of transfer regimens include a respective first intermediate model for training a respective output model, wherein training the respective output models using the respective ones of the transfer regimens is based on the input model and the respective first intermediate models;

training the respective output models using the respective ones of the plurality of transfer regimens, each of the respective ones of the plurality of transfer regimens including a respective first transfer technique used to transfer knowledge from the input model to the respective first intermediate model and a respective second transfer technique used to transfer knowledge from the respective first intermediate model to the respective output model;

evaluating performance of the respective output models based on the set of requirements including the accuracy requirement;

determining that a first output model of the respective output models trained using a first transfer regimen satisfies the set of requirements including the accuracy requirement and outperforms other respective output models with respect to the accuracy requirement; and selecting the first output model for use in a first application.

20. A computer program product comprising:

one or more non-transitory computer readable storage media; and program instructions collectively stored on the one or more non-transitory computer readable storage media to perform operations comprising:

receiving an input model and a set of requirements for an output model, wherein the set of requirements for the output model includes an accuracy requirement for the output model;

selecting a plurality of transfer regimens to evaluate, wherein respective ones of the plurality of transfer regimens include a respective first intermediate model for training a respective output model, wherein training the respective output models using the respective ones of the transfer regimens is based on the input model and the respective first intermediate models;

training the respective output models using the respective ones of the plurality of transfer regimens, each of the respective ones of the plurality of transfer regimens including a respective first transfer technique used to transfer knowledge from the input model to the respective first intermediate model and a respective second transfer technique used to transfer knowledge from the respective first intermediate model to the respective output model;

evaluating performance of the respective output models based on the set of requirements including the accuracy requirement;

determining that a first output model of the respective output models trained using a first transfer regimen satisfies the set of requirements including the accuracy requirement and outperforms other respective output models with respect to the accuracy requirement; and selecting the first output model for use in a first application.

* * * * *